United States Patent
Murray

(10) Patent No.: US 11,505,627 B2
(45) Date of Patent: Nov. 22, 2022

(54) CONTINUOUS PROCESS FOR PRODUCING HALOGENATED ISOOLEFIN COPOLYMER

(71) Applicant: ARLANXEO Singapore Pte. Ltd., Singapore (SG)

(72) Inventor: Adrian H. Murray, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/299,508

(22) PCT Filed: Dec. 17, 2019

(86) PCT No.: PCT/CA2019/051834
§ 371 (c)(1),
(2) Date: Jun. 3, 2021

(87) PCT Pub. No.: WO2020/124221
PCT Pub. Date: Jun. 25, 2020

(65) Prior Publication Data
US 2022/0025084 A1   Jan. 27, 2022

(30) Foreign Application Priority Data
Dec. 21, 2018  (EP) .................................... 18215140

(51) Int. Cl.
C08F 8/22   (2006.01)
C08F 210/12   (2006.01)
C08F 210/10   (2006.01)

(52) U.S. Cl.
CPC ............. C08F 8/22 (2013.01); C08F 210/10 (2013.01); C08F 210/12 (2013.01); C08F 2800/10 (2013.01); C08F 2810/50 (2013.01)

(58) Field of Classification Search
CPC ...... C08F 8/22; C08F 8/20; C08F 8/18; C08F 210/10; C08F 210/12; C08F 110/10;
(Continued)

(56) References Cited

U.S. PATENT DOCUMENTS 2,637,751 A   5/1953   Brooks et al.
2,944,578 A   7/1960   Baldwin et al.
(Continued)

FOREIGN PATENT DOCUMENTS

CA   1265891 A   2/1990
CA   2787228 A1   7/2011
(Continued)

OTHER PUBLICATIONS

International Search Report and Written Opinion, PCT Application No. PCT/CA2019/0518342 dated Jun. 25, 2020.
(Continued)

*Primary Examiner* — Robert C Boyle
(74) *Attorney, Agent, or Firm* — The Dobrusin Law Firm, P.C.

(57) ABSTRACT

A continuous process for producing a halogenated isoolefin copolymer involves: polymerizing at least one isoolefin monomer and at least one copolymerizable unsaturated monomer in an organic diluent to produce a halogenatable isoolefin copolymer in an organic medium; contacting the organic medium with an aqueous medium comprising an LCST anti-agglomerant compound; removing or partially removing the organic diluent to produce an aqueous slurry of the halogenatable isoolefin copolymer; dissolving the aqueous slurry in an organic solvent in a closed apparatus to form an unsaturated halogenatable copolymer cement in water, and phase separating the water from the cement in the apparatus; contacting the separated halogenatable isoolefin copolymer cement with a halogenating agent and an aqueous solution of a $C_{1-20}$ organic peracid oxidant to form a two-phase reaction medium having an organic phase and an aqueous phase, the organic peracid oxidant capable of converting hydrogen halide to free halogen; and, recovering halogenated isoolefin copolymer.

20 Claims, 1 Drawing Sheet

(58) Field of Classification Search
CPC ......... C08F 10/10; C08C 19/12; C08C 19/14; C08C 19/16
See application file for complete search history.

(56) References Cited

U.S. PATENT DOCUMENTS

| | | | |
|---|---|---|---|
| 2,948,709 A | | 8/1960 | Kuntz et al. |
| 2,964,493 A | | 12/1960 | Hakala et al. |
| 3,018,275 A | * | 1/1962 | Cottle ..................... C08F 8/20 525/356 |
| 3,278,467 A | | 10/1966 | Burke et al. |
| 3,932,370 A | | 1/1976 | Landi et al. |
| 3,960,988 A | | 6/1976 | Kent |
| 4,405,760 A | | 9/1983 | Howard, Jr. et al. |
| 5,408,018 A | | 4/1995 | Rath |
| 5,569,723 A | | 10/1996 | Baade et al. |
| 5,670,582 A | * | 9/1997 | Chung ..................... C08F 8/22 525/356 |
| 5,674,955 A | | 10/1997 | Kerr et al. |
| 5,681,901 A | | 10/1997 | Newman |
| 5,886,106 A | | 3/1999 | Sumner et al. |
| 7,001,966 B2 | | 2/2006 | Lang et al. |
| 9,644,041 B2 | | 9/2017 | Groemping et al. |
| 2013/0131281 A1 | * | 5/2013 | Gronowski ............. C08F 6/003 525/356 |
| 2014/0309362 A1 | * | 10/2014 | Leiberich ............... C09J 115/02 524/574 |
| 2016/0312021 A1 | | 10/2016 | Thompson et al. |
| 2022/0017651 A1 | | 1/2022 | Davidson et al. |
| 2022/0017655 A1 | | 1/2022 | Thompson |
| 2022/0017658 A1 | | 1/2022 | Murray |
| 2022/0017659 A1 | | 1/2022 | Murray |

FOREIGN PATENT DOCUMENTS

| | | |
|---|---|---|
| CA | 2836521 A1 | 11/2012 |
| CA | 2934725 A1 | 7/2015 |
| EP | 0646103 B1 | 8/1997 |
| EP | 1479724 A1 | 11/2004 |
| WO | 98/003562 A1 | 1/1998 |
| WO | 2010/006983 A1 | 1/2010 |
| WO | 2011/089091 A1 | 7/2011 |
| WO | 2011/089092 A1 | 7/2011 |
| WO | 2013/011017 A1 | 1/2013 |
| WO | WO2016/149802 * | 9/2016 |

OTHER PUBLICATIONS

Rubber Technology, 3rd Ed., Edited by Maurice Morton, Kluwer Academic Publishers, pp. 297-300 or U.S. Pat. No. 5,886,106 issued Mar. 23, 1999.
Co-pending U.S. Appl. No. 17/299,608, filed Jun. 3, 2021. (Published as US 2022/0017658).
Co-pending U.S. Appl. No. 17/311,267, filed Jun. 4, 2021. (Published as US 2022/0017659).
Co-pending U.S. Appl. No. 17/311,297, filed Jun. 4, 2021. (Published as US 2022/0017651 A1).
Co-pending U.S. Appl. No. 17/311,857, filed Jun. 8, 2021. (Published as US 2022/0017655 A1).
International Search Report and Written Opinion, PCT Application No. PCT/CA2019/051836 dated Feb. 18, 2020.
International Search Report and Written Opinion, PCT Application No. PCT/CA2019/051835 dated Mar. 3, 2020.
International Search Report and Written Opinion, PCT Application No. PCT/CA2019/051799 dated Feb. 28, 2020.
International Search Report and Written Opinion, PCT Application No. PCT/CA2019/051818 dated Mar. 19, 2020.

* cited by examiner

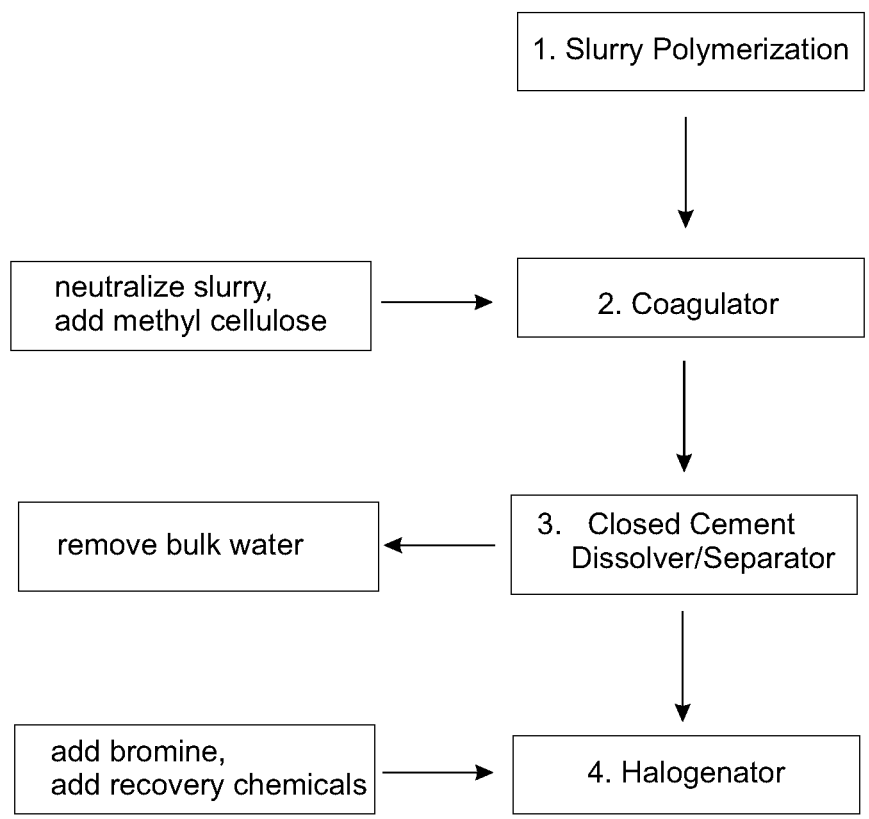

US 11,505,627 B2

CONTINUOUS PROCESS FOR PRODUCING HALOGENATED ISOOLEFIN COPOLYMER

CLAIM OF PRIORITY

This application is a national phase filing under 35 USC § 371 from PCT Patent Application serial number PCT/CA2019/051834 filed on Dec. 17, 2019 and published as WO 2020/0124221 A1 on Jun. 25, 2020, which claims priority to European Patent Application Number EP 18215140.7 filed on Dec. 21, 2018. PCT Patent Application serial number PCT/CA2019/051834 and European Patent Application Number EP 18215140.7 are each incorporated by reference herein in its entirety.

FIELD

This application relates to an overall continuous process for producing a halogenated isoolefin copolymer.

BACKGROUND

The production of halogenated isoolefin copolymers, such as halogenated butyl rubber, requires polymerization of at least one isoolefin monomer and at least one copolymerizable monomer to form a halogenatable isoolefin copolymer, followed by halogenation of the halogenatable isoolefin copolymer with a halogenating agent, such as elemental bromine ($Br_2$). In between the polymerization of the monomers and the halogentation of the halogenatable isoolefin copolymer, a number of processing steps are required to provide the halogenatable isoolefin copolymer in a state that permits halogenation of the copolymer. The processing steps may be performed batchwise where each step receives a batch from a previous step and the step performed on the entire batch before moving to the next step. However, from an efficiency viewpoint, it is preferable to conduct the overall process continuously whereby each preceding step constantly feeds the next step. While potentially more efficient, continuous processes suffer from processing problems over time such as fouling, accumulation of impurities and formation of side products, which lead to downtime in an effort to correct the problems.

There remains a need for a cost-effective, efficient continuous process for producing halogenated isoolefin copolymers, such as halogenated butyl rubber, which suffers from less potential downtime due to problems that arise over time.

SUMMARY

A continuous process for producing a halogenated isoolefin copolymer comprises: polymerizing at least one isoolefin monomer with at least one copolymerizable unsaturated monomer in an organic diluent to produce a halogenatable isoolefin copolymer in an organic medium; contacting the organic medium with an aqueous medium comprising an anti-agglomerant comprising a lower critical solution temperature (LCST) compound; removing or partially removing the organic diluent to produce an aqueous slurry comprising particles of the halogenatable isoolefin copolymer; dissolving the aqueous slurry in an organic solvent in a closed dissolving/separating apparatus to form a halogenatable isoolefin copolymer cement in water, and phase separating the water from the cement in the closed dissolving/separating apparatus; contacting the separated halogenatable isoolefin copolymer cement under halogenation conditions with a halogenating agent and an aqueous solution of a $C_{1-20}$ organic peracid oxidant to form a two-phase reaction medium comprising an organic phase and an aqueous phase, the organic peracid oxidant capable of converting hydrogen halide to free halogen; and, recovering halogenated isoolefin copolymer containing at least 0.05 mol % of chemically combined halogen.

The halogenation process is continuous and results in less fouling of process equipment, purer halogenated isoolefin copolymer and increased halogen utilization without the necessity for a low water content in the halogenation medium and without the need to use a surfactant to disperse an oxidant in the organic phase of the halogenation medium. The continuous process is a cost-effective and efficient process for producing halogenated isoolefin copolymers, such as butyl rubber.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1 is a flow diagram of a continuous process for producing a halogenated isoolefin copolymer by halogenating a halogenatable isoolefin copolymer.

DETAILED DESCRIPTION

The process provides for a continuous process to produce a halogenated isoolefin copolymer. A preferred embodiment of the process is illustrated in FIG. 1. As illustrated in FIG. 1, the process may comprise slurry polymerization 1 of at least one isoolefin monomer and at least one copolymerizable unsaturated monomer in a polymerization reactor to form an halogenatable isoolefin copolymer, neutralization of the slurry and then coagulation of the halogenatable isoolefin copolymer in the presence of an anti-agglomerant in a coagulator 2 to form particles of the halogenatable isoolefin copolymer, formation of a halogenatable isoolefin copolymer cement by dissolving the particles of the halogenatable isoolefin copolymer in an organic diluent followed by separation of bulk water from the cement in a closed cement dissolver/separator apparatus 3, and finally halogenation of the halogenatable isoolefin copolymer cement in a halogenator 4 using a halogenating agent (e.g. bromine) and recovery chemicals to recover the halogenated isoolefin copolymer. Steps of the continuous process are further described below.

Polymerization

The process involves polymerizing at least one isoolefin monomer and at least one copolymerizable unsaturated monomer in an organic diluent to produce a halogenatable isoolefin copolymer in an organic medium. Polymerization occurs in a polymerization reactor. Suitable polymerization reactors include flow-through polymerization reactors, plug flow reactor, moving belt or drum reactors, and the like. The process preferably comprises slurry polymerization of the monomers.

The halogenatable isoolefin copolymer preferably comprises repeating units derived from at least one isoolefin monomer and repeating units derived from at least one copolymerizable unsaturated monomer, and optionally repeating units derived from one or more further copolymerizable monomers. The halogenatable isoolefin copolymer preferably comprises an unsaturated isoolefin copolymer.

Suitable isoolefin monomers include hydrocarbon monomers having 4 to 16 carbon atoms. In one embodiment, the isoolefin monomers have from 4 to 7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Suitable copolymerizable unsaturated monomers include multiolefins, p-methyl styrene, β-pinene or mixtures thereof. Multiolefin monomers include hydrocarbon monomers having 4 to 14 carbon atoms. In one embodiment, the multiolefin monomers include conjugated dienes. Examples of suitable multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof.

The halogenatable isoolefin copolymer may optionally include one or more additional copolymerizable monomers. Suitable additional copolymerizable monomers include, for example, styrenic monomers, such as alkyl-substituted vinyl aromatic co-monomers, including but not limited to a $C_1$-$C_4$ alkyl substituted styrene. Specific examples of additional copolymerizable monomers include, for example, α-methyl styrene, p-methyl styrene, chlorostyrene, cyclopentadiene and methylcyclopentadiene. Indene and other styrene derivatives may also be used. In one embodiment, the halogenatable isoolefin copolymer may comprise random copolymers of isobutylene, isoprene and p-methyl styrene.

In one embodiment, the halogenatoable isoolefin copolymer may be formed by copolymerization of a monomer mixture. Preferably, the monomer mixture comprises about 80-99.9 mol % of at least one isoolefin monomer and about 0.1-20 mol % of at least one copolymerizable unsaturated monomer, based on the monomers in the monomer mixture. More preferably, the monomer mixture comprises about 90-99.9 mol % of at least one isoolefin monomer and about 0.1-10 mol % of at least one copolymerizable unsaturated monomer. In one embodiment, the monomer mixture comprises about 92.5-97.5 mol % of at least one isoolefin monomer and about 2.5-7.5 mol % of at least one copolymerizable unsaturated monomer. In another embodiment, the monomer mixture comprises about 97.4-95 mol % of at least one isoolefin monomer and about 2.6-5 mol % of at least one copolymerizable unsaturated monomer.

If the monomer mixture comprises the additional copolymerizable with the isoolefins and/or copolymerizable unsaturated monomers, the additional copolymerizable monomer preferably replaces a portion of the copolymerizable unsaturated monomer. When a multiolefin monomer is used, the monomer mixture may also comprise from 0.01% to 1% by weight of at least one multiolefin cross-linking agent, and when the multiolefin cross-linking agent is present, the amount of multiolefin monomer is reduced correspondingly.

The halogenatable isoolefin copolymer may be prepared by any suitable method, of which several are known in the art. The process is preferably conducted as a slurry polymerization process in a diluent in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

The diluent may comprise an organic diluent. Suitable organic diluents may include, for example, alkanes, chloroalkanes, cycloalkanes, aromatics, hydrofluorocarbons (HFC) or any mixture thereof. Chloroalkanes are preferred and may include, for example methyl chloride, dichloromethane or any mixture thereof. Methyl chloride is particularly preferred. The monomers are generally polymerized cationically in the diluent at temperatures in a range of from −120° C. to +20° C., preferably −100° C. to −50° C., more preferably −95° C. to −65° C. The temperature is preferably about −80° C. or colder.

Coagulation

The process further involves coagulating the halogenatable isoolefin copolymer into particles (also called crumbs)

in a coagulator. Coagulation comprises contacting the organic medium with an aqueous medium comprising an anti-agglomerant comprising a lower critical solution temperature (LCST) compound, and removing or partially removing the organic diluent to produce an aqueous slurry comprising particles of the halogenatable isoolefin copolymer.

As used herein a LCST compound is a compound which is soluble in a liquid medium at a lower temperature but precipitates from the liquid medium above a certain temperature, the so called lower critical solution temperature or LCST temperature. This process is reversible, so the system becomes homogeneous again on cooling down. The temperature at which the solution clarifies on cooling down is known as the cloud point (see German standard specification DIN EN 1890 of September 2006). This temperature is characteristic for a particular substance and liquid medium. The LCST compound preferably has a cloud point of 0 to 100° C., preferably 5 to 100° C., more preferably 15 to 80° C., and even more preferably 20 to 70° C. in the liquid medium. The cloud point can be determined by at least one of the following methods: 1) DIN EN 1890 of September 2006, method A; 2) DIN EN 1890 of September 2006, method C; 3) DIN EN 1890 of September 2006, method E; 4) DIN EN 1890 of September 2006, method A wherein the amount of compound tested is reduced from 1 g per 100 ml of distilled water to 0.05 g per 100 ml of distilled water; and, 5) DIN EN 1890 of September 2006, method A wherein the amount of compound tested is reduced from 1 g per 100 ml of distilled water to 0.2 g per 100 ml of distilled water.

The LCST compound is preferably poly(N-isopropylacrylamide), poly(N-isopropylacrylamide-co-N, N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glycopolymers, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols (preferably those with 2 to 8 ethylene glycol units and 2 to 8 polypropylene units, more preferably 2 to 6 ethylene glycol units and 2 to 6 polypropylene units), compounds of formula (I)

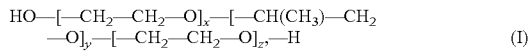

with y=3 to 10 and x and z=1 to 8, whereby y+x+z is from 5 to 18,
ethoxylated iso-$C_{13}H_{27}$-alcohols (preferably with an ethoxylation degree of 4 to 8), polyethylene glycol with 4 to 50 ethyleneglycol units (preferably 4 to 20 ethyleneglycol units), polypropylene glycol with 4 to 30 propyleneglycol units (preferably 4 to 15 propyleneglycol units), polyethylene glycol monomethyl ether with 4 to 50 ethyleneglycol units (preferably 4 to 20 ethyleneglycol units), polyethylene glycol dimethyl ether with 4 to 50 ethyleneglycol units (preferably 4 to 20 ethyleneglycol units), polyethylene glycol monoethyl ether with 4 to 50 ethyleneglycol units (preferably 4 to 20 ethyleneglycol units), polyethylene glycol diethyl ether with 4 to 50 ethyleneglycol units (preferably 4 to 20 ethyleneglycol units), polypropylene glycol monomethyl ether with 4 to 50 propyleneglycol units (preferably 4 to 20 propyleneglycol units), polypropylene glycol dimethyl ether with 4 to 50 propyleneglycol units (preferably 4 to 20 propyleneglycol units), polypropylene glycol monoethyl ether with 4 to 50 propyleneglycol units (preferably 4 to 20 propyleneglycol units), diethyl ether with 4 to 50 propyleneglycol units (preferably 4 to 20 propyleneglycol units), or any mixture thereof. The LCST compound is more preferably methyl cellulose, hydroxypropyl cellulose, hydroxyethyl methylcellulose, hydroxypropyl methylcellulose or any mixture thereof. The LCST compound is even more preferably methyl cellulose.

The amount of LCST compound present in the aqueous medium is preferably from 1 to 20,000 ppm, preferably 3 to 10,000 ppm, more preferably 5 to 5,000 ppm, even more preferably 10 to 5,000 ppm, with respect to the amount of halogenatable isoolefin copolymer present in the organic medium.

In one embodiment, the LCST compound exhibits a molecular weight of at least 1,500 g/mol, preferably at least 2,500 g/mol, more preferably at least 4,000 g/mol. In one embodiment, the LCST compound exhibits a molecular weight of 2,000,000 g/mol or less, preferably 1,000,000 g/mol or less. Where a mixture of different LCST compounds is applied the weight average molecular weight is for example of from 1,500 g/mol to 2,000,000 g/mol.

The use of an LCST compound or mixture thereof as described herein as an anti-agglomerant leads to less fouling of process equipment, while reducing the overall amount of anti-agglomerant used in the coagulation step. Further, the amount of metal-containing anti-agglomerant (e.g. zinc stearate, talcum, layered silica and the like) and the amount of other anti-agglomerants, surfactants and emulsifiers can be reduced, or eliminated altogether in the resulting aqueous slurry when using LCST compounds as anti-agglomerant during coagulation. In some embodiments, the aqueous slurry may comprise 0 to 5,000 ppm, or 0 to 2,000 ppm, or 0 to 1,000 ppm, or 0 to 800 ppm, or 0 to 100 ppm, or 0 to 70 ppm, or 0 to 50 ppm, or 0 to 30 ppm, or 0 to 20 ppm, or 0 to 10 ppm, or no other anti-agglomerants, surfactants and emulsifiers, with respect to the amount of halogenatable isoolefin copolymer present in the aqueous slurry. Further information on LCST compounds may be found in United States Patent Publication US 2016/0312021 published Oct. 27, 2016, the entire contents of which is herein incorporated by reference.

The organic diluent as well as any residual monomers may be removed from the halogenatable isoolefin copolymer by flash separation using steam to produce the aqueous slurry. Removal of the diluent and residual monomers in such a 'wet' process leaves an aqueous slurry of the copolymer containing a significant amount of water. Alternatively, the diluent as well as any residual monomers may be removed or partially removed from the halogenatable isoolefin copolymer by flash separation using a heated organic solvent in which the halogenatable isoolefin copolymer is soluble or by simple distillation. Where simple distillation is used, some of the organic diluent may remain as organic solvent. Removal of the diluent and residual monomers in such a 'dry' process provides a slurry containing less water.

In order to provide an economic throughput while still achieving efficient separation, it is preferred that the aqueous slurry being provided to the dissolving/separating apparatus comprises from 5% to 20% by weight of the halogenatable isoolefin copolymer in water, based on total weight of the aqueous slurry. More preferably, the aqueous slurry comprises from 6% to 12% by weight of the halogenatable isoolefin copolymer in water, based on total weight of the slurry.

Dissolution and Separation of Cement

The process further involves dissolving the aqueous slurry in an organic solvent in a closed cement dissolving/separating apparatus to form a halogenatable isoolefin copolymer cement in water, and phase separating the water from the cement in the closed cement dissolving/separating apparatus. The closed cement dissolving/separating apparatus utilizes a closed vessel for both the dissolution of the rubber in an organic solvent and the separation of water from the halogenatable isoolefin copolymer cement. A closed loop system for recovering the organic solvent and maintaining a desired proportion of organic solvent to halogenatable isoolefin copolymer may also be included. The closed dissolving/separating apparatus helps prevent excessive emissions of organic solvent.

In the process, the aqueous slurry of the halogenatable isoolefin copolymer is continuously provided from the coagulator to a dissolving zone in the closed cement dissolving/separating apparatus where the halogenatable isoolefin copolymer is dissolved in the organic solvent to form a halogenatable isoolefin copolymer cement in water. From the dissolving zone, the cement preferably flows laterally into a separating zone where an interface layer is formed between a water layer and a cement layer. The use of the LOST compound in the coagulator results in faster formation of the interface layer, resulting in better separation of the water layer from the cement layer.

The closed dissolving/separating apparatus comprises a closed dissolving zone for receiving both the aqueous slurry and the organic solvent. The dissolving zone may comprise a mixer for agitating the aqueous slurry and the organic solvent to dissolve the halogenatable isoolefin copolymer in the organic solvent to form the halogenatable isoolefin copolymer cement in water. The apparatus further comprises a closed separating zone in fluid communication with the dissolving zone. The separating zone is configured for phase separation of the halogenatable isoolefin copolymer cement from the water with formation of a water layer and a cement layer separated by an interface layer. The interface layer is also known as a 'rag layer'. The separation of the water layer from the cement layer preferably occurs by the influence of gravity. Thus, the cement layer and the water layer are vertically spaced apart once the two layers are separated. Because the water layer is denser than the cement layer, the water layer forms below the cement layer.

In a gravity separation process, it can be important to disrupt the interface layer in order to prevent plugging and contamination of downstream equipment. The disruption of the interface layer is desirably done in a gentle manner in order to prevent emulsification of the organic and water layers at the interface layer, which prolongs the time period required for adequate separation to take place. In one embodiment, the apparatus further comprises mixing means extending into the interface layer to agitate and disrupt the interface layer. The mixing means may comprise a mechanical mixer or a fluid conduit for introducing recycled copolymer cement into the interface layer. When the mixing means comprises a fluid conduit, disruption of the interface layer is accomplished through recycling a portion of the cement layer into the separating zone. The amount of recycled cement layer is desirably kept small, as recycle decreases the overall residence time through the separating zone and thereby negatively impacts the separation process. In order to minimize the amount of cement layer required to be recycled it is desirable that the recycled cement layer be introduced directly into the interface layer to gently disrupt the interface layer and thereby prevent plugging of downstream equipment. In some embodiments, the ratio of recycled cement layer to total cement layer exiting the separation zone is less than 20% by volume, preferably less than 15% by volume, more preferably less than 10% by volume. In some embodiments, the interface layer is mixed with a power input of from 0.001 to 0.05 W/l, preferably from 0.01 to 0.04 W/l, more preferably from 0.015 to 0.03 W/l.

In some embodiments, residence time in the dissolving zone is from 3 to 120 minutes, preferably from 4 to 60 minutes, more preferably from 5 to 30 minutes. Mixing time in the dissolving zone may be influenced by at least the mixing temperature and choice of organic solvent. Dissolution and/or separation may be conducted at room temperature or greater than room temperature. Dissolution and separation may be conducted at the same or different temperatures. Dissolution and separation are preferably conducted at a temperature of from 20° C. to 85° C., preferably from 25° C. to 75° C., more preferably from 30° C. to 70° C., still more preferably from 50° C. to 70° C. Dissolution and/or separation are preferably conducted at ambient pressure, below ambient pressure or above ambient pressure. At the temperatures mentioned above, the pressure may rise to values well above ambient pressure but is then typically below 2 MPa.

The halogenatable isoolefin copolymer cement exiting the separator may have a low water content, for example less than 1 wt %, or even 0 wt %, water based on total weight of the cement, or a significant water content, for example 1 wt % or greater or 1.5 wt % or greater, based on total weight of the cement. In some embodiments, the water content of the cement may be 3 wt % or less, based on total weight of the cement. In some embodiments, the water content of the cement may be 1-30 wt % or 1.5-15 wt % or 2-30 wt % or 18-22 wt % or 2-20 wt % or 2-15 wt % or 5-30 wt % or 5-20 wt % or 5-15 wt % or 5-10 wt % or 5-8 wt %, based on total weight of the cement.

The organic solvent is preferably a non-halogenated organic solvent. Preferably, the non-halogenated organic solvent comprises at least 80 wt % of one or more non-halogenated aliphatic hydrocarbons having a boiling point in the range of 25° C. to 100° C. at a pressure of 1013 hPa, the remainder being other non-halogenated hydrocarbons. More preferably, the non-halogenated organic solvent comprises at least 90 wt %, or at least 95 wt % or at least 99 wt % of one ore more non-halogenated aliphatic hydrocarbons. Weights are based on total weight of the organic solvent. Non-halogenated organic solvents preferably comprise an alkane, cycloalkane and any mixture thereof. Alkanes and cycloalkanes may include, for example, n-pentane, isopentane, cyclopentane, n-hexane, 2-methylpentane, 3-methylpentane, methylcyclopentane, 2,2-dimethylbutane, 2,3-dimethylbutane, n-pentane, 2,2-dimethylpentane or any mixture thereof. Alkanes and cycloalkanes are preferably C5 or C6 solvents, which include n-pentane, pentane isomers, n-hexane or hexane isomers. The organic solvent most preferably comprises n-hexane or isopentane.

In the apparatus, because both dissolving and separating occur in a common vessel, the amount of piping between vessels is reduced. The dissolving and separating zones are preferably separated from one another by internal vessel structure, for example a wall with a flow-through aperture, that restricts or prevents uncontrolled movement of fluid between zones. Further, the separating zone may comprise at least two outlets vertically spaced apart by a distance sufficient to separately collect the water layer and the cement layer. In some embodiments, the at least two outlets comprise a first outlet configured for output of the water layer from the separating zone, and a second outlet configured for output of the cement layer from the separating zone. The fluid outlets are preferably located at an opposite end of the separating from the dissolving zone to promote a more even residence time distribution and to reduce the propensity for fluid short circuiting within the apparatus.

Preferably, the closed dissolving zone and the closed separating zone are in a single flow-through vessel with the closed dissolving zone disposed horizontally adjacent the closed separating zone. Thus, the apparatus is preferably configured for lateral flow through the apparatus from the closed dissolving zone through the closed separating zone. The lateral arrangement of zones improves the degree of separation that takes place and better controls residence time of the water and cement layers. By flowing horizontally, a desired flow rate can be extracted from each of the upper and lower layers in the separating zone to control the residence time of each layer, preferably in order to maintain a constant residence time for each layer. Vertical flow patterns promote mixing between the upper and lower layers making it difficult to match the residence times of the layers in order to maintain a homogeneous residence time distribution within the separating zone. In contrast, horizontal flow patterns generally promote better overall separation between the upper and lower layers. In addition, a vertical separator generally has a smaller interface area for phase separation compared to a horizontal separator and a vertical separator is prone to matting and plugging due to copolymer accumulation at the interface layer, especially without agitation of the interface layer. The dimensions of the dissolving zone may be the same as or different than those of the separating zone. In some embodiments, the dissolving zone has a larger width and shorter length than the separating zone.

Further information on closed cement dissolver/separator apparatuses may be found in U.S. Pat. No. 9,644,041 issued May 9, 2017, the entire contents of which is herein incorporated by reference.

Halogenation

To form the halogenated isoolefin copolymer, the halogenatable isoolefin copolymer cement is transferred to a halogenator and subjected to a halogenation process using a halogenating agent under halogenation conditions. Halogenation can be performed by adapting a process known by those skilled in the art (for example the procedures described in Rubber Technology, 3rd Ed., Edited by Maurice Morton, Kluwer Academic Publishers, pp. 297-300 or U.S. Pat. No. 5,886,106 issued Mar. 23, 1999, the contents of both of which are herein incorporated by reference) and modifying the process as described herein.

To improve efficiency of halogenation, the halogenation process is modified by contacting a halogenatable isoolefin copolymer cement with a halogenating agent and an aqueous solution of an oxidant comprising an organic peracid. In the halogenator, a two-phase reaction medium comprising an organic phase and an aqueous phase is formed in which the organic peracid is partitioned between the organic and aqueous phases due to significant solubility of the organic peracid in the organic phase.

Halogenating agents useful for halogenating the halogenatable isoolefin copolymer may comprise molecular chlorine ($Cl_2$) or molecular bromine ($Br_2$) and/or organo-halide or inorganic halide precursors thereto, for example dibromodimethyl hydantoin, tri-chloroisocyanuric acid (TCIA), n-bromosuccinimide, sodium bromide, hydrogen bromide or the like. Preferably, the halogenating agent comprises chlorine ($Cl_2$) or bromine ($Br_2$), more preferably bromine. Preferably, halogenation comprises bromination. The amount of halogenating agent added is controlled to provide a final halogen content of at least 0.05 mol %, preferably 0.05-2.5 mol %, in the halogenated isoolefin copolymer. The amount of halogenating agent used has a linear relationship with the final halogen content (i.e. the functional halogen amount) on the halogenated isoolefin copolymer. A larger amount of halogenating agent leads to a larger functional halogen amount in the halogenated isoolefin copolymer.

Halogenation is performed in an organic phase. The organic phase preferably comprises the organic solvent used in the closed cement dissolving/separating apparatus to form the halogenatable isoolefin copolymer cement.

Halogenation may be conducted for a length of time to achieve the desired level of halogenation. The length of time is preferably 60 minutes or less. Even at 20 minutes or less, or at 10 minutes or less, or at 5 minutes or less, significant halogenation of the unsaturated isoolefin copolymer may be achieved, irrespective of whether an emulsifier is used. Preferably, halogenation is conducted for a minimum of 1 minute. Preferably, the halogenation time is 1-60 minutes, or 1-20 minutes, or 1-10 minutes, or 1-5 minutes.

Halogenation may be conducted at any suitable temperature and is preferably conducted at a temperature up to about 90° C. In some embodiments, the temperature may be up to about 80° C. In other embodiments, the temperature may be up to about 65° C. However, lower temperatures generally provide for increased halogenation efficiency. The increased halogenation efficiency at lower temperatures is more pronounced at higher concentrations of the halogenatable isoolefin copolymer in the reaction medium. Temperatures in a range of 0-50° C. or 0-45° C. or 15-45° C. or 20-60° C. or 23-54° C. or 23-45° C. or 10-35° C. or 20-30° C. are preferred. In one embodiment, the halogenatable isoolefin copolymer is cooled before contacting the solution of the halogenatable isoolefin copolymer cement with the halogenating agent and the aqueous solution of organic peracid oxidant.

The halogenatable isoolefin copolymer is preferably present in the reaction medium in an amount of 1-60 wt %, based on total weight of the reaction medium. More preferably, the halogenatable isoolefin copolymer is present in an amount of 5-50 wt %, even more preferably 5-40 wt %, yet more preferably 10-30 wt %, for example 20 wt %, based on total weight of the reaction medium.

The aqueous phase is formed from the aqueous solution of oxidant, from water generated by the halogenation reaction and from any additional water contained in the halogenatable isoolefin polymer cement. The aqueous solution of oxidant together with the water generated by the halogenation reaction typically form less than 1 wt % of the reaction medium, for example 0.03-0.3 wt %, based on total weight of the reaction medium.

The reaction medium may contain 0-20 wt %, based on total weight of the reaction medium, of additional water arising from water contained in the halogenatable isoolefin polymer cement depending on the process used to prepare the polymer cement. The additional water is water from the halogenatable isoolefin polymer cement and does not include the water used to prepare the aqueous solution of the oxidant or the water generated by the halogenation reaction. It is an advantage of the present process that the reaction medium may contain significant amounts of additional water, for example 1-20 wt % additional water, based on total weight of the reaction medium. In some embodiments, the additional water may comprise or 1.5-15 wt % or 2-20 wt % or 2-15 wt % or 5-20 wt % or 5-15 wt % or 5-10 wt % or 5-8 wt % of the reaction medium, based on total weight of the reaction medium. Even so, in some embodiments the reaction medium may contain an insignificant amount of additional water, for example less than 1 wt % additional water, or even 0 wt % additional water, based on total weight of the reaction medium.

Unlike hydrogen peroxide, the organic peracid has a significant solubility in the organic phase to provide sufficient concentration of the organic peracid in the organic phase to oxidize hydrogen halide (HX) formed during halogenation of the halogenatable isoolefin copolymer back to molecular halogen without the necessity for a low water content in the reaction medium and without the need to use a surfactant to disperse the oxidant in the organic phase. Prior art methods using hydrogen peroxide as the oxidant (e.g. U.S. Pat. No. 3,018,275) require that the reaction medium have less than 1 wt % water based on the total weight of the reaction medium, otherwise the excess water would solubilize the hydrogen peroxide sequestering the hydrogen peroxide in the aqueous phase thereby diminishing oxidation efficiency leading to no or less improvement in halogenation efficiency. As stated in U.S. Pat. No. 3,018,275: "It is necessary to have only a sufficient amount of water present to assist the reaction between the halogen and oxidizing agent to take place." Thus, in U.S. Pat. No. 3,018,275, there is no water added to the process other than in the hydrogen peroxide solution. The use of a surfactant, as in U.S. Pat. No. 5,681,901, to disperse the hydrogen peroxide in the organic phase is also unsatisfactory because the surfactant may contaminate the halogenated isoolefin copolymer, and the use of surfactant nevertheless does not provide satisfactory improvement in halogenation efficiency unless the water content of the reaction medium is less than 2 wt % and halogenation time is extended to 30-60 minutes. Extended halogenation time may result in changes to the microstructure of the halogenated isoolefin copolymer. In the present process, on the other hand, whether or not emulsifier is added, there is no change in halogenation efficiency at halogenation times of 5 minutes or less. Further, if the halogenation time is extended to 20 minutes, peracid plus emulsifier provides higher halogenation efficiency than hydrogen peroxide plus emulsifier by 10%, which is a significant improvement. Therefore, the present halogenation process may be performed in a reaction medium having less than 1 wt % water and/or in the presence of a surfactant, but, unlike prior art processes, there is no requirement for these conditions in order to achieve improved halogen utilization.

The organic peracids useful in the present process are at least partially soluble in the organic phase, allowing the oxidant to partition between the organic and aqueous phases, thereby regenerating molecular halogen at an accelerated rate. The rate of reaction for the conversion of halide back into halogen is sufficiently fast to allow the reaction to take place in a continuous reactor with a short residence time, thereby significantly reducing the cost of engineering a large contact vessel for the halogenating reaction. Further, because the organic peracid oxidant is at least partially soluble in the organic phase, performance is maintained even at elevated water concentrations relevant at an industrial scale. Because the organic peracid has improved solubility and reactivity in the organic phase in comparison to hydrogen peroxide, the effectiveness of the organic peracid at regenerating $Br_2$ is less sensitive to water concentrations in the reaction medium than is hydrogen peroxide.

The organic peracids are preferably $C_{1-20}$ organic peracids, more preferably $C_{1-6}$ organic peracids, yet more preferably $C_{1-4}$ organic peracids or $C_{1-3}$ organic peracids. Some examples of organic peracids include performic acid (PFA), peracetic acid (PAA), perpropanoic acid (PPA), perbutanoic acid (PBA), t-butyl hydroperoxide (t-BHP), pervaleric acid (PVA) and any mixture thereof. The organic peracid may be pre-made and dissolved directly into the aqueous solution for contacting with the organic solvent containing the halogenatable isoolefin copolymer cement.

Alternatively, or additionally, the organic peracid may be synthesized on-site from the reaction of a water-soluble oxidizing agent (e.g. hydrogen peroxide) with a suitable organic acid in the presence of a catalytic amount of a mineral acid (e.g. sulfuric acid). The organic acid and water-soluble oxidizing agent (and mineral acid, if desired) may be introduced into a reactor directly and allowed to eventually form the organic peracid. The organic peracid may be pre-formed by mixing the organic acid and the water-soluble oxidizing agent in an aqueous solution, and then adding the aqueous solution to the reaction medium to form the aqueous phase. Pre-forming the organic peracid by mixing the water-soluble oxidizing agent and the organic acid in an aqueous solution, and then adding the aqueous solution to the reaction medium to form the aqueous phase leads to a reduction in reaction time and/or a reduction in the size of the reactor required to perform the halogenation. On-site production of the organic peracid requires no storage of unstable chemicals and generates organic peracid only as needed leading to less waste.

The organic acid is soluble in the aqueous phase and at least partially soluble in the organic phase. The organic acid preferably has a partition coefficient (k) between water and 1-octanol of from 0.05 to 24.55, more preferably 0.25 to 24.55, yet more preferably 0.25 to 17. With these preferred partition coefficients, the organic acid is more preferably a $C_{1-6}$ organic acid, yet more preferably a $C_{1-4}$ organic acid or a $C_{1-3}$ organic acid. At decreasing water content in the reaction medium, organic acids with fewer carbon atoms are preferred. At or below 10 wt % additional water, $C_{1-4}$ organic acids are preferred. At or below 6 wt % additional water, $C_{1-3}$ organic acids are preferred. At 0 wt % additional water, $C_1$ organic acid is preferred. Organic peracids with more carbon atoms appear to be less sensitive to water content, perhaps because they are less soluble in water. Further, as water content increases, micellization of the aqueous phase in the organic phase is diminished providing less surface area contact between the phases, which may reduce transfer of the more water-soluble organic peracids between the organic and aqueous phases.

Some examples of organic acids include formic acid (FA), acetic acid (AA), propanoic acid (PA), butanoic acid (BA), valeric acid (VA), any branched derivatives thereof and any mixture thereof. The use of a water-soluble oxidizing agent with an organic acid permits re-oxidizing the organic acid to the organic peracid, thereby maintaining the concentration of the organic peracid in the organic phase. The rate of reaction may be controlled by the choice of organic acid, which limits hazards associated with storing highly reactive organic peracids. In some embodiments, formic acid is preferred due to high reactivity and decomposition into non-hazardous and easily removed byproducts upon completion of the process (e.g. $CO_2$, $H_2O$).

The concentration of organic peracid present in the reaction medium is preferably at least 0.06 moles of organic peracid per mole of halogenating agent, or at least 0.1 moles of organic peracid per mole of halogenating agent, or at least 0.5 moles of organic peracid per mole of halogenating agent. The concentration of organic peracid present in the reaction medium is preferably 1-5 moles, more preferably 1-3 moles, of organic peracid per mole of halogenating agent. When an organic acid and a water-soluble oxidizing agent are used to generate the organic peracid, the organic acid and water-soluble oxidizing agent are present in sufficient concentrations to generate the organic peracid at the above concentrations. The desired concentration of organic peracid is a function of the desired halogenation time. For a halogenation time of 5 minutes, 1-2 moles, for example 2 moles, of organic peracid per mole of halogenating agent is preferred. Lower concentrations of organic peracid may be offset by longer halogenation time.

In the present process, all or some of the halogenating agent may comprise hydrogen halide (HX) added to the aqueous phase. Because HX is converted into molecular halogen ($X_2$) by the organic peracid in the aqueous phase, the added HX can act as a source of halogenating agent.

The isoolefin copolymer is brominated with $Br_2$ in the organic phase (e.g. hexanes or isopentane) to form brominated isoolefin copolymer and HBr. HBr reacts with peracid in the organic phase to form $Br_2$, carboxylic acid and water. The water and the carboxylic acid, which is completely soluble in water, transfer to the aqueous phase where hydrogen peroxide ($H_2O_2$) dissolved in the aqueous phase reacts with the carboxylic acid to form the peracid. The peracid, being at least partially soluble in the organic phase is in equilibrium between the organic and aqueous phases. As the peracid reacts with HBr, concentration of the peracid in the organic phase is maintained by transfer of peracid from the aqueous phase to the organic phase. In this manner, peracid is continuously produced to regenerate $Br_2$ in the organic phase thereby increasing bromine utilization. After bromination is complete, residual carboxylate produced during a neutralization step may be extracted from the brominated isoolefin copolymer by washing with water, in which the carboxylate is completely soluble.

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A continuous process for producing a halogenated isoolefin copolymer, the process comprising:
   (a) polymerizing at least one isoolefin monomer and at least one copolymerizable unsaturated monomer in an organic diluent to produce a halogenatable isoolefin copolymer in an organic medium;
   (b) contacting the organic medium with an aqueous medium comprising an anti-agglomerant comprising a lower critical solution temperature (LCST) compound;
   (c) removing or partially removing the organic diluent to produce an aqueous slurry comprising particles of the halogenatable isoolefin copolymer;
   (d) dissolving the aqueous slurry in an organic solvent in a closed dissolving/separating apparatus to form an halogenatable isoolefin copolymer cement in water, and phase separating the water from the cement in the closed dissolving/separating apparatus;
   (e) contacting the separated halogenatable isoolefin copolymer cement under halogenation conditions with a halogenating agent and an aqueous solution of a $C_{1-20}$ organic peracid oxidant to form a two-phase reaction medium comprising an organic phase and an aqueous phase, the organic peracid oxidant capable of converting hydrogen halide to free halogen; and,
   (f) recovering halogenated isoolefin copolymer containing at least 0.05 mol % of chemically combined halogen.

2. The process of claim 1, wherein the at least one isoolefin monomer is isobutylene and the at least one copolymerizable unsaturated monomer is isoprene or p-methyl styrene.

3. The process of claim 1, wherein the organic diluent comprises methyl chloride.

4. The process of claim 1, wherein the LCST compound comprises poly(N-isopropylacrylamide), poly(N-isopropylacrylamide -co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glycopolymers, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, compounds of formula (I)

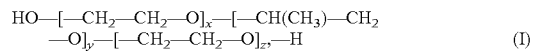

with y=3 to 10 and x and z=1 to 8, whereby y+x+z is from 5 to 18, ethoxylated iso-$C_{13}H_{27}$-alcohols, polyethylene glycol with 4 to 50 ethyleneglycol units, polypropylene glycol with 4 to 30 propyleneglycol units, polyethylene glycol monomethyl ether with 4 to 50 ethyleneglycol unit, polyethylene glycol dimethyl ether with 4 to 50 ethyleneglycol units, polyethylene glycol monoethyl ether with 4 to 50 ethyleneglycol units, polyethylene glycol diethyl ether with 4 to 50 ethyleneglycol units, polypropylene glycol monomethyl ether with 4 to 50 propyleneglycol units, polypropylene glycol dimethyl ether with 4 to 50 propyleneglycol units, polypropylene glycol monoethyl ether with 4 to 50 propyleneglycol units, diethyl ether with 4 to 50 propyleneglycol units, or any mixture thereof.

5. The process of claim 1, wherein the organic solvent is a non-halogenated organic solvent.

6. The process of claim 5, wherein the non-halogenated organic solvent comprises hexanes, isopentane or a mixture thereof.

7. The process of claim 1, wherein the closed dissolving/separating apparatus comprises:
   a closed dissolving zone for receiving both the aqueous slurry and the organic solvent, the dissolving zone comprising a mixer for agitating the aqueous slurry and the organic solvent to dissolve the halogenatable isoolefin copolymer in the organic solvent to form the halogenatable isoolefin copolymer cement in water; and,
   a closed separating zone in fluid communication with the dissolving zone, the separating zone being configured for phase separation of the halogenatable isoolefin copolymer cement from the water with formation of a water layer and a cement layer separated by an interface layer, and the separating zone comprising a first outlet configured for output of the water layer from the separating zone, and a second outlet configured for output of the cement layer from the separating zone, wherein the closed dissolving zone and the closed separating zone are in a single flow-through vessel with the closed dissolving zone disposed horizontally adjacent the closed separating zone, and wherein the apparatus is configured for lateral flow through the vessel from the closed dissolving zone through the closed separating zone.

8. The process of claim 1, wherein the water content of the cement is 1-20 wt %, based on total weight of the cement.

9. The process of claim 1, wherein the water content of the cement is 3 wt % or less, based on total weight of the cement.

10. The process of claim 7, wherein the water content of the cement is 1.5-15 wt %, based on total weight of the cement.

11. The process of claim 1, wherein the organic peracid oxidant is a $C_{1-4}$ organic peracid.

12. The process of claim 1, wherein the organic peracid oxidant is pre-made and dissolved directly into the aqueous solution.

13. The process of claim 1, wherein the organic peracid oxidant is produced in situ in the aqueous solution by reacting an organic acid with a water-soluble oxidizing agent in the aqueous solution prior to contacting the halogenatable isoolefin copolymer cement with the aqueous solution.

14. The process of claim 1, wherein halogenating the halogenatable isoolefin copolymer is performed in an absence of emulsifier.

15. The process of claim 1, wherein the halogenating agent is $Br_2$.

16. The process of claim 1, wherein the contacting the separated halogenatable isoolefin copolymer cement with the halogenating agent is conducted for 1-60 minutes at a temperature in a range of 20-60° C.

17. The process of claim 1, wherein
the at least one isoolefin monomer is isobutylene and the at least one copolymerizable unsaturated monomer is isoprene or p-methyl styrene;
the organic diluent comprises methyl chloride;
the organic solvent is a non-halogenated organic solvent;
the water content of the cement is 1.5-15 wt %, based on total weight of the cement; and
the organic peracid oxidant is a $C_{1-4}$ organic peracid.

18. The process of claim 17, wherein
the non-halogenated organic solvent comprises hexanes, isopentane or a mixture thereof;
the water content of the cement is 1.5 to 3 wt % or less, based on total weight of the cement;
halogenating the halogenatable isoolefin copolymer is performed in an absence of emulsifier; and
the halogenating agent is $Br_2$.

19. The process of claim 18, wherein the LCST compound comprises poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N -diethylacrylamide), poly[2-(dimethylamino)ethyl methacrylate], poly(2-oxazoline) glycopolymers, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, compounds of formula (I)

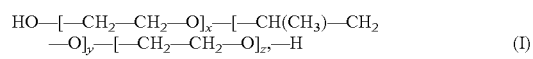

$$HO-[-CH_2-CH_2-O]_x-[-CH(CH_3)-CH_2-O]_y-[-CH_2-CH_2-O]_z-H \quad (I)$$

with y=3 to 10 and x and z=1 to 8, whereby y+x+z is from 5 to 18, ethoxylated iso-$C_{13}H_{27}$-alcohols, polyethylene glycol with 4 to 50 ethyleneglycol units, polypropylene glycol with 4 to 30 propyleneglycol units, polyethylene glycol monomethyl ether with 4 to 50 ethyleneglycol unit, polyethylene glycol dimethyl ether with 4 to 50 ethyleneglycol units, polyethylene glycol monoethyl ether with 4 to 50 ethyleneglycol units, polyethylene glycol diethyl ether with 4 to 50 ethyleneglycol units, polypropylene glycol monomethyl ether with 4 to 50 propyleneglycol units, polypropylene glycol dimethyl ether with 4 to 50 propyleneglycol units, polypropylene glycol monoethyl ether with 4 to 50 propyleneglycol units, diethyl ether with 4 to 50 propyleneglycol units, or any mixture thereof;

wherein the contacting the separated halogenatable isoolefin copolymer cement with the halogenating agent is conducted for 1-60 minutes at a temperature in a range of 20-60° C.;

and wherein the closed dissolving/separating apparatus comprises:

a closed dissolving zone for receiving both the aqueous slurry and the organic solvent, the dissolving zone comprising a mixer for agitating the aqueous slurry and the organic solvent to dissolve the halogenatable isoolefin copolymer in the organic solvent to form the halogenatable isoolefin copolymer cement in water; and, a closed separating zone in fluid communication with the dissolving zone, the separating zone being configured for phase separation of the halogenatable isoolefin copolymer cement from the water with formation of a water layer and a cement layer separated by an interface layer, and the separating zone comprising a first outlet configured for output of the water layer from the separating zone, and a second outlet configured for output of the cement layer from the separating zone, wherein the closed dissolving zone and the closed separating zone are in a single flow-through vessel with the closed dissolving zone disposed horizontally adjacent the closed separating zone, and wherein the apparatus is configured for lateral flow through the vessel from the closed dissolving zone through the closed separating zone.

20. A composition comprising the halogenated isoolefin copolymer prepared by the method of claim 1, and the organic peracid oxidant.

* * * * *